United States Patent
Huang et al.

(10) Patent No.: US 9,747,408 B2
(45) Date of Patent: Aug. 29, 2017

(54) GENERATING FINAL MASK PATTERN BY PERFORMING INVERSE BEAM TECHNOLOGY PROCESS

(71) Applicant: Taiwan Semiconductor Manufacturing Company, Ltd., Hsin-Chu (TW)

(72) Inventors: Hsu-Ting Huang, Hsinchu (TW); Ru-Gun Liu, Hsinchu County (TW); Shuo-Yen Chou, Hualien County (TW); Tsai-Sheng Gau, Hsinchu (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 0 days.

(21) Appl. No.: 14/832,026

(22) Filed: Aug. 21, 2015

(65) Prior Publication Data

US 2017/0053056 A1    Feb. 23, 2017

(51) Int. Cl.
   *G06F 17/50*    (2006.01)
(52) U.S. Cl.
   CPC ...... *G06F 17/5081* (2013.01); *G06F 17/5009* (2013.01); *G06F 17/5072* (2013.01); *G06F 2217/12* (2013.01)
(58) Field of Classification Search
   CPC ............. G06F 17/5081; G06F 17/5009; G06F 17/5072; G06F 2217/12
   See application file for complete search history.

(56) References Cited

U.S. PATENT DOCUMENTS

| | | | |
|---|---|---|---|
| 7,063,478 B2* | 6/2006 | Taniguchi | H01L 29/66757 257/E21.413 |
| 7,487,489 B2* | 2/2009 | Granik | G03F 1/36 716/51 |
| 7,704,684 B2* | 4/2010 | Rogers | B82B 3/00 430/325 |
| 7,805,700 B2* | 9/2010 | Peng | G03F 1/36 430/30 |
| 7,907,697 B2* | 3/2011 | Maltz | G06T 11/005 378/7 |
| 8,221,939 B2* | 7/2012 | Zable | G06F 17/50 430/296 |
| 8,279,409 B1 | 10/2012 | Sezginer et al. | |
| 8,473,875 B2* | 6/2013 | Fujimura | G06F 17/5077 716/53 |
| 8,527,916 B1 | 9/2013 | Chiang et al. | |
| 8,572,520 B2 | 10/2013 | Chou et al. | |
| 8,589,828 B2 | 11/2013 | Lee et al. | |
| 8,589,830 B2 | 11/2013 | Chang et al. | |
| 8,627,241 B2 | 1/2014 | Wang et al. | |

(Continued)

FOREIGN PATENT DOCUMENTS

| | | |
|---|---|---|
| TW | 201005564 | 2/2010 |
| TW | 201443555 | 11/2014 |
| TW | 201514617 | 4/2015 |

*Primary Examiner* — Naum B Levin
(74) *Attorney, Agent, or Firm* — Haynes and Boone, LLP

(57) ABSTRACT

The present disclosure provides an integrated circuit (IC) method in accordance with some embodiments. The method includes receiving an IC design layout; and performing an inverse beam technology (IBT) process to the IC design layout, thereby generating a final mask pattern, wherein the IBT process uses a single IBT model to simulate both a mask making process and a wafer making process.

20 Claims, 8 Drawing Sheets

(56) References Cited

U.S. PATENT DOCUMENTS

| | | | |
|---|---|---|---|
| 8,631,360 B2 | 1/2014 | Wang et al. | |
| 8,631,361 B2 | 1/2014 | Feng | |
| 8,673,748 B2* | 3/2014 | Matsumura | C23C 16/0218 257/103 |
| 8,719,739 B2* | 5/2014 | Fujimura | G06F 17/50 716/53 |
| 8,732,626 B2 | 5/2014 | Liu et al. | |
| 8,739,080 B1 | 5/2014 | Tsai et al. | |
| 8,745,550 B2 | 6/2014 | Cheng et al. | |
| 8,751,976 B2 | 6/2014 | Tsai et al. | |
| 8,762,900 B2 | 6/2014 | Shin et al. | |
| 8,788,982 B2* | 7/2014 | Lippincott | G06F 17/5081 716/132 |
| 8,812,999 B2 | 8/2014 | Liu et al. | |
| 8,826,196 B2* | 9/2014 | Sahouria | G06F 17/5081 716/55 |
| 8,850,366 B2 | 9/2014 | Liu et al. | |
| 9,038,003 B2* | 5/2015 | Pearman | G06F 17/50 716/52 |
| 9,091,935 B2* | 7/2015 | Pang | G03F 1/70 |
| 9,170,481 B2* | 10/2015 | Rieger | G03F 1/36 |
| 9,341,936 B2* | 5/2016 | Fujimura | G06F 17/5072 |
| 2006/0269875 A1* | 11/2006 | Granik | G03F 1/36 430/311 |
| 2010/0216061 A1* | 8/2010 | Hendrickx | G03F 1/36 430/5 |
| 2012/0096412 A1* | 4/2012 | Fujimura | G06F 17/5077 716/53 |
| 2013/0070222 A1* | 3/2013 | Fujimura | G03F 1/36 355/53 |
| 2013/0267047 A1 | 10/2013 | Shih et al. | |
| 2013/0283216 A1* | 10/2013 | Pearman | G06F 17/50 716/52 |
| 2013/0283219 A1* | 10/2013 | Fujimura | G06F 17/50 716/53 |
| 2014/0101624 A1 | 4/2014 | Wu et al. | |
| 2014/0109026 A1 | 4/2014 | Wang et al. | |
| 2014/0120459 A1 | 5/2014 | Liu et al. | |
| 2014/0215416 A1* | 7/2014 | Sahouria | G06F 17/5081 716/53 |
| 2014/0254913 A1* | 9/2014 | Pang | G03F 1/70 382/144 |
| 2014/0282290 A1* | 9/2014 | Rieger | G03F 1/36 716/51 |
| 2014/0282299 A1 | 9/2014 | Chua et al. | |
| 2014/0282334 A1 | 9/2014 | Hu et al. | |
| 2015/0022892 A1* | 1/2015 | Schuetz | G21K 1/06 359/565 |
| 2015/0362834 A1* | 12/2015 | Choi | G03F 1/36 716/53 |

* cited by examiner

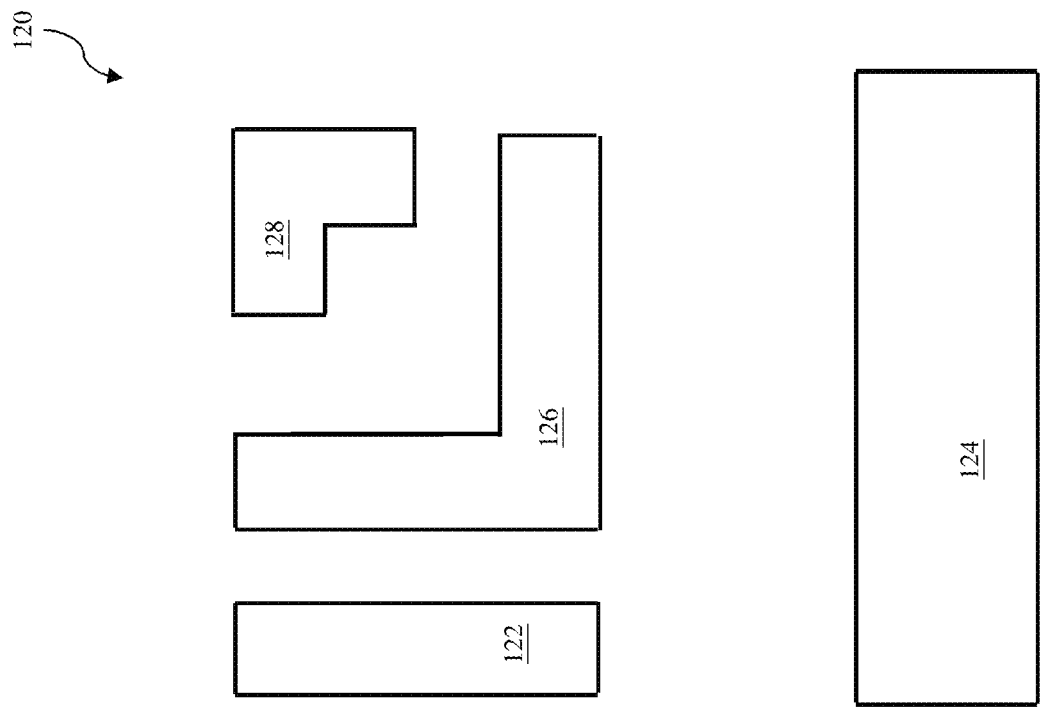

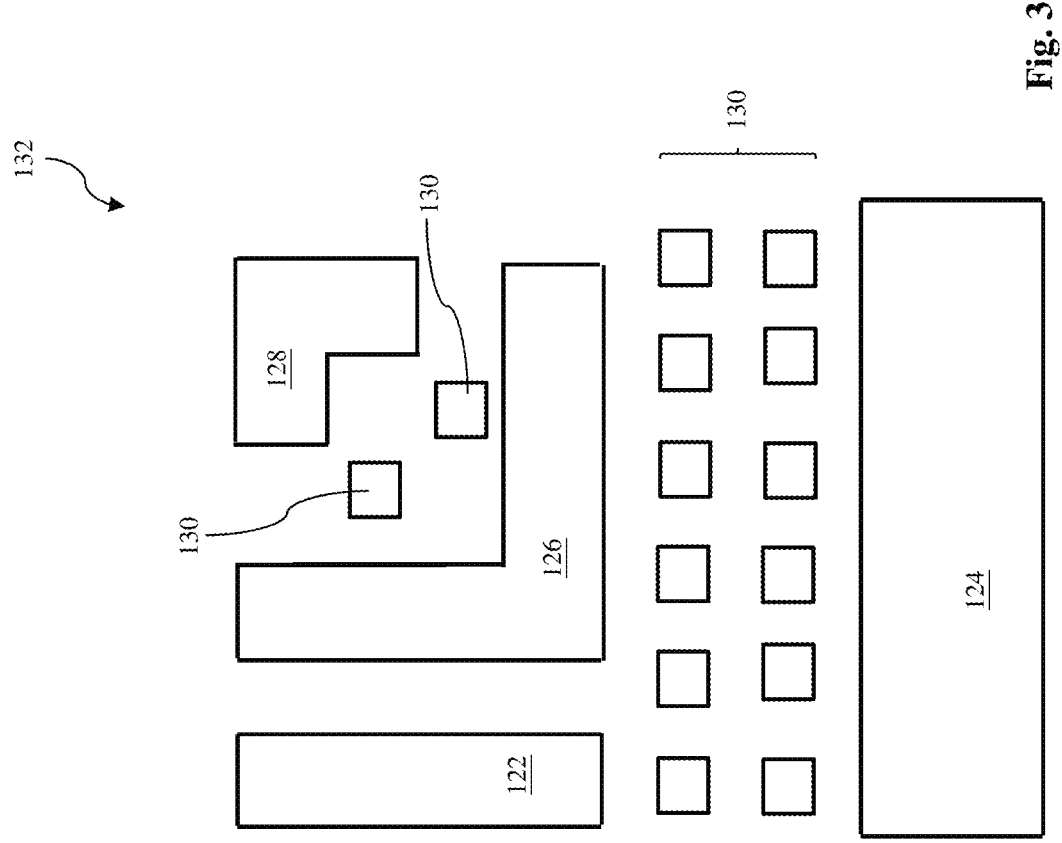

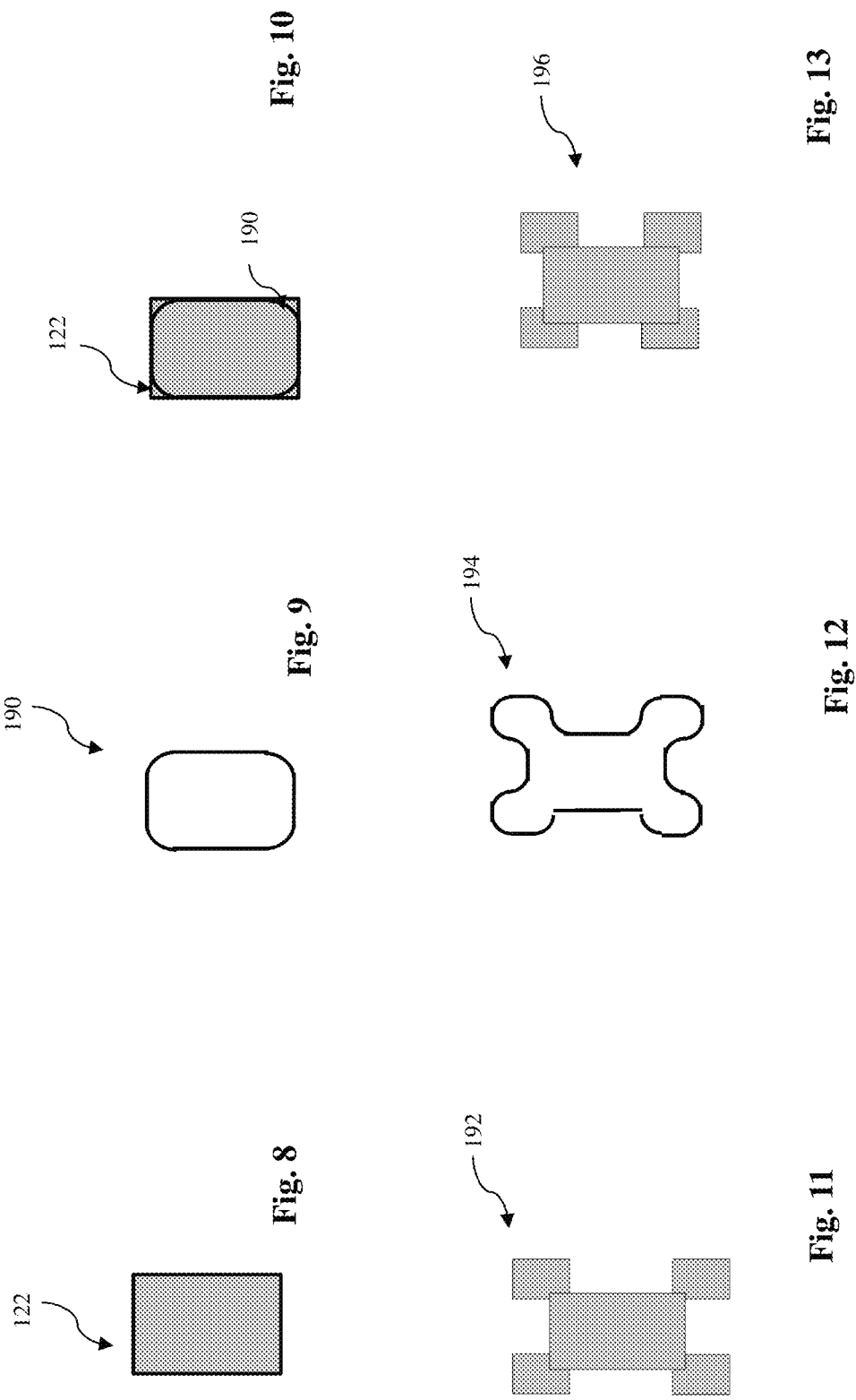

GENERATING FINAL MASK PATTERN BY PERFORMING INVERSE BEAM TECHNOLOGY PROCESS

BACKGROUND

The integrated circuit (IC) design is more challenging when semiconductor technologies are continually progressing to smaller feature sizes, such as 32 nanometers, 28 nanometers, 20 nanometers, and below. The performance of a designed circuit is seriously influenced by the imaging of various circuit patterns, such as doped wells, source and drains, gate electrodes, vias/contacts and other circuit features. When advanced circuit design has three dimensional structures with fin-like active regions, it is more difficult to form circuit features with proper shapes and sizes. To enhance the imaging effect when a design pattern is transferred to a wafer, optical proximity correction (OPC) is indispensable. The design pattern is adjusted to generate an image on the wafer with improved resolution. However, the final wafer result is associated with various processes and factors. The lithography printing capability is limited by resist blur, mask diffraction, projection imaging resolution, and electron beam blur of mask writing. The existing method is not effective to provide optimized wafer results in terms of circuit performance and fabrication cost.

Therefore, what is needed is a method for IC design and mask making to effectively reduce patterning errors and address the above issues.

BRIEF DESCRIPTION OF THE DRAWINGS

Aspects of the present disclosure are best understood from the following detailed description when read in association with the accompanying figures. It is noted that, in accordance with the standard practice in the industry, various features in the drawings are not drawn to scale. In fact, the dimensions of illustrated features may be arbitrarily increased or decreased for clarity of discussion.

FIGS. 2-3 are schematic views of an IC design layout at various design stages, constructed in accordance with some embodiments.

FIGS. 8-13 are schematic views of a main feature of an IC design layout at various design stages, constructed in accordance with some embodiments.

DETAILED DESCRIPTION

Figures 1, 4:
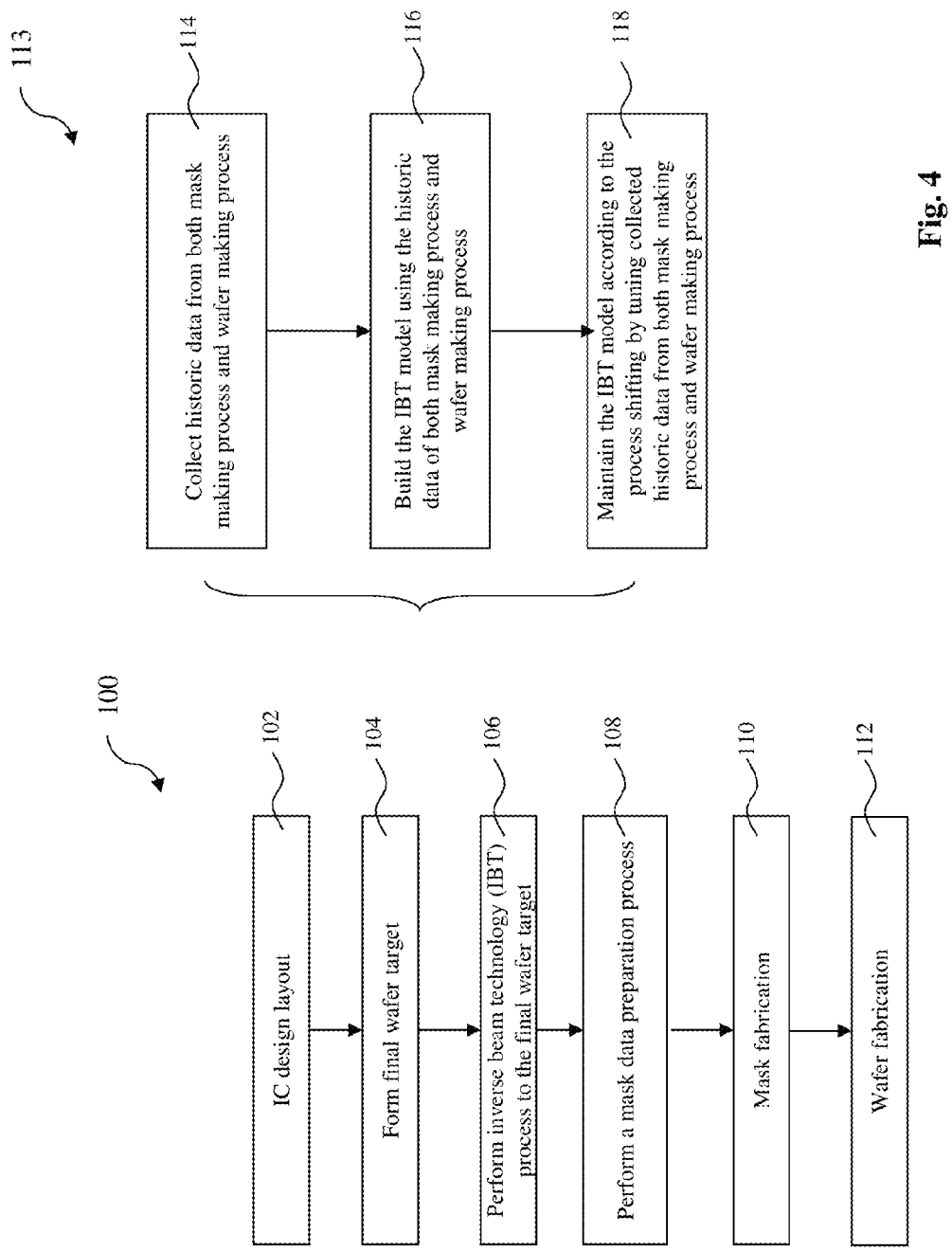
FIG. 1 is a flowchart of a method for making an integrated circuit (IC), constructed in accordance with some embodiments.
FIG. 4 is a flowchart of a method for building an inverse beam technology (IBT) model, constructed in accordance with some embodiments.

It is understood that the following disclosure provides many different embodiments, or examples, for implementing different features of the invention. Specific examples of components and arrangements are described below to simplify the present disclosure. These are, of course, merely examples and are not intended to be limiting. The present disclosure may repeat reference numerals and/or letters in the various examples. This repetition is for the purpose of simplicity and clarity and does not in itself dictate a relationship between the various embodiments and/or configurations discussed.

FIG. 1 is a flowchart of a method 100 for making an integrated circuit (IC), particularly IC designing and mask making, constructed in accordance with some embodiments. The method 100 begins at operation 102 by receiving an IC design layout (or IC design pattern) from a designer. In one example, the designer can be a design house. In another example, the designer is a design team separated from a semiconductor manufacturer that is capable of making IC products according to the IC design layout. In various embodiments, the semiconductor manufacturer is capable of making photomasks, semiconductor wafers, or both. The IC design layout includes one or more layers of circuit patterns designed for an IC product and based on the specification of the IC product. A photomask refers to a patterned substrate used in a lithography process to pattern a semiconductor wafer. In the following description, photomask, mask and reticle are used exchangeably.

The IC design layout is presented in one or more data files having the information of the circuit patterns. In one example, the IC design layout is expressed in a graphic data system (GDS or GDSII) format known in the art. In other examples, the IC design layout may be expressed in other proper format, such as open artwork system interchange standard (OASIS or OAS). The designer, based on the specification of the product to be manufactured, implements a proper design procedure to generate the IC design layout. The design procedure may include logic design, physical design, and/or place and route. As an example, a portion of the IC design layout includes various IC features (also referred to as main features), such as active region, doped wells, source and drain, gate electrode, vias/contacts and metal lines of the interlayer interconnection, and openings for bonding pads, to be formed in a semiconductor substrate (such as a silicon wafer) and various material layers disposed over the semiconductor substrate. The IC design layout may include certain assist features, such as those features for imaging effect, processing enhancement, and/or mask identification information.

FIG. 2 illustrates a schematic view of a design layout 120 in accordance with some embodiments. The IC design layout 120 includes a plurality of circuit features, such as exemplary circuit features 122, 124, 126 and 128. Those circuit features are also referred to as main features. The main features in the IC design layout 120 constitute a portion of the integrated circuit of the IC product and are to be formed or defined in one material layer of the semiconductor wafer. Therefore the IC design layout 120 defines a pattern layer of the IC product. In various examples, a pattern layer of the IC product includes a pattern that defines active regions, source/drains, gate electrodes, or contact features. In one embodiment, the IC design layout 120 is a pattern defining contact holes to be formed in a dielectric material layer of the semiconductor wafer.

Referring to FIG. 1, the method 100 may include an operation 104 by forming a final wafer pattern from the IC design layout 120. In some embodiments, the operation 104 includes adding dummy features to the IC design layout 120 in order optimize the semiconductor fabrication. For example, the IC design layout 120 includes a pattern that defines various active regions to be formed on a semiconductor wafer. In furtherance of the examples, the active regions are formed on the semiconductor wafer by a procedure that includes lithography patterning to form an etch mask; etching to form trenches in the semiconductor wafer; filling a dielectric material in the trenches; and performing a chemical mechanical polishing (CMP) process to form shallow trench isolation (STI) features on the semiconductor wafer, thereby defining active regions surrounded by the STI features. The CMP process removes the excessive dielectric material and planarizes the top surface of the semiconductor wafer. However, the CMP process may also introduce dishing and erosion effects. The dummy features are added to the IC design layout to tune the pattern density, thereby reducing the side effects of the CMP process and improve the result of the CMP process. In another example, the IC design layout includes a pattern that defines active regions. The dummy features are inserted to the IC design layout such that a thermal annealing process (such as a thermal annealing process to activate the ion implanted dopant) applied to the semiconductor wafer is improved and the thermal annealing variation from location to location is reduced or eliminated. In another example, the IC design layout is a pattern that defines metal lines in the interconnection structure. The dummy features are added to the IC design layout in the die-corner-circuit-forbidden region for chip corner stress relief. In some other examples, the operation 104 may additionally or alternatively include adding other features, such as mask identification number (such as a barcode), alignment mark, and/or test pattern to the IC design layout in proper locations, such as in the frame region for various fabrication usages and considerations. The output of the operation 104 is the final wafer pattern.

In one example for illustration, dummy features 130 are inserted into the IC design layout 120, thereby forming a final wafer pattern 132 as shown in FIG. 3. In the present example, the dummy features 130 are added to change the local pattern density such that the pattern density has less variation from location to location, thereby the processing variation and other unexpected effects are reduced or eliminated.

The method 100 includes an operation 106 by performing inverse beam technology (IBT) process to the IC design layout 120, thereby generating a final mask pattern. The final mask pattern is the pattern to be formed on the photomask, which is further used to pattern a semiconductor wafer by a lithography process using the patterned photomask. If the operation 104 is present, the IBT process is applied to the final wafer pattern, thereby generating the final mask pattern.

The IBT process is a model based process to tune the IC design layout using an IBT model. The IBT model is a single mathematical model (IBT model) to collectively simulate a mask making process to pattern the photomask and a wafer making process to pattern the semiconductor wafer. In the present embodiment, the mask making process includes an electron-beam direct writing process used to pattern the photomask. Specifically, the wafer making process includes a lithography exposing process to form an exposure image on a photoresist layer coated on the semiconductor wafer. The photoresist layer is a material layer sensitive to the radiation energy (such as ultraviolet light) during the lithography exposing process and is chemically changed by the radiation energy. In the present example, the wafer making process further includes processing associated with the characteristics of the photoresist. In furtherance of the example, the wafer making process includes radiation-induced reaction of the photoresist during the lithography exposing process and dissolution of the photoresist during a developing process, thereby forming a patterned photoresist layer. In some examples, the wafer making process further includes an etching process applied to the semiconductor wafer, thereby forming a patterned material layer on the semiconductor wafer using the patterned photoresist layer as an etch mask. In an alternative example, the wafer making process further includes an ion implantation process applied to the semiconductor wafer, thereby forming doped features in the semiconductor wafer using the patterned photoresist layer as an implantation mask.

The photomask is patterned by the mask making process using mask data (e.g., a fractured mask layout). Due to various fabrication factors of the mask making process, such as electron-beam blur, the real mask pattern formed on the photomask is different from the mask layout.

The semiconductor wafer is patterned by a wafer making process to form a patterned material layer on the semiconductor wafer. In various examples, the pattered material layer includes etched material layer (such as etched semiconductor layer, etched dielectric material layer or etched conductive material layer), or alternatively doped semiconductor layer (such as doped silicon layer). As noted above, the wafer making process includes lithography exposing process, developing process, and etching process (or ion implantation process). Due to various fabrication factors of the wafer making process, such as photoresist blur, mask diffraction, projection imaging resolution, acid diffusion, and/or etching bias, the real wafer pattern formed on the semiconductor wafer is different from the wafer target pattern, which is the final wafer pattern or IC design layout. The IBT model simulates the mask making process and the wafer making process to predict the real wafer pattern according to the wafer target pattern and provides a feedback to tune the final wafer pattern such that the real wafer pattern is substantially close to the wafer target pattern.

The IBT model is a single model to simulate both the mask making process and wafer making process. The IBT model is built based on the historic fabrication data from both the mask making process and the wafer making process. The IBT process is a model-based process to generate the mask data (e.g., fractured mask layout) according to the simulation result using the IBT model such that the simulated wafer contour is close to the final wafer pattern or the difference therebetween is less than a predefined tolerable range. In other words, the simulated wafer contour reaches the wafer target. The IBT process is an iterative process using the final wafer pattern as an input and generating the final mask data as an output. During the iterative process, the mask data is modified until the simulated wafer contour meets the wafer target. Thus generated mask data can be used to simulate the final mask pattern.

The IBT model is further described below according to some embodiments. In the present embodiments, the final mask pattern is transferred to the mask by an electron-beam writing process and is therefore defined in the e-beam writing dose map. In the following description, f(x, y) is a two dimensional function defining the electron-beam shot map; the function $\Phi_1$ defines the mask making function that simulates the mask making process; and the mask pattern (the mask contour formed on the mask according to the simulated mask making process) is defined in the mask pattern m(x, y). Thus the mask pattern m(x, y) is related to the electron-beam shot map as $$m(x,y) = \Phi_1(f(x,y)) \qquad \text{eq. (1).}$$

The projected wafer image is defined by wafer image I(x, y). The wafer imaging function $\Phi_2$ simulates the imaging of the mask on the wafer during the lithography exposing process, which is implemented to pattern the semiconductor wafer using the mask. Thus, the projected wafer image I=I(x, y) on the wafer is related to the mask pattern as $$I(x,y)=\Phi_2(m(x,y)) \quad \text{eq. (2)}.$$

Furthermore, the wafer pattern P(x, y) defines the simulated wafer contour, which is the photoresist pattern on the semiconductor wafer. The wafer pattern is also related to the behavior of the photoresist layer coated on the semiconductor wafer, such as the response of the photoresist to the radiation energy during the lithography exposing process, the behavior during the post-exposure-baking and the dissolution during the developing process. In some embodiments, the wafer pattern function $\Phi_3$ simulates the characteristics of the photoresist behavior.

In some other embodiments, the wafer pattern P(x, y) defines the simulated wafer contour, which is the pattern of the material layer on the wafer after the photoresist pattern is transferred to the material layer by an etching process. In this case, the wafer pattern is related to both the behavior of the photoresist layer and the etching process, such as the response of the photoresist to the radiation energy during the lithography exposing process, the behavior during the post-exposure-baking, the dissolution during the developing process, and the etching bias of the etching process. In furtherance of the embodiments, the wafer pattern function $\Phi_3$ simulates the characteristics of the photoresist behavior and the characteristics of the etching process. Thus, the wafer pattern P(x, y) on the wafer is related to the projected wafer image as $$P(x,y)=\Phi_3(I(x,y)) \quad \text{eq. (3)}.$$

Considering all of the above factors expressed in equations 1, 2 and 3, the wafer pattern P(x, y) is determined by the electron-beam shot map f(x, y) as $$P(x,y)=\Phi_3(\Phi_2(\Phi_1(f(x,y)))) \quad \text{eq. (4)}.$$

The equation 4 provides the IBT model, which is single model to collectively simulate both the mask making process and the wafer making process. In the operation 106, the IBT process directly relates the mask data to the wafer pattern by simulation using the single IBT model. In the IBT process, the mask data f(x, y) is determined by minimizing the difference between the simulated wafer pattern P(x, y) and the final wafer target determined at the operation 104 through the iterative process, as expressed as $$\min_f \|P - T\|. \quad \text{eq. (5)}$$

wherein the function T is the desired wafer target. The minimization process is also optimization. When the difference is minimized, the mask data is optimized since the final result (the wafer pattern) meets the desired wafer target. In some embodiments, the wafer target T is directly the input GDS layout defined at the operation 104. In other embodiments, the wafer target is defined differently.

During the IBT process, the minimization process may use a proper cost function to effectively minimize the difference. In some embodiments, the cost function is defined according to the edge placement error (EPE) and the IBT process becomes the following optimization process, $$\min_f \left\{ \sum_j \|EPE(x_j, y_j)\| \right\}. \quad \text{eq. (6)}$$

wherein the edge placement error function EPE defines the difference between the simulated wafer pattern P and the wafer target T at locations on edges of the both patterns, which will be further described later. In some embodiments, the cost function is defined according to the area difference and the IBT process becomes the following optimization process, $$\min_f \left\{ \sum_k \|\Delta \text{Area}(P_k, T_k)\| \right\}. \quad \text{eq. (7)}$$

wherein the index k represents a $k^{th}$ region or polygon, assuming that a pattern (P or T) includes a plurality features or polygons, such as those shown in FIG. 3. The summation is over all regions.

In some embodiments, the IBT model may be expressed in a format by assuming that the simulation of the mask making process is expressed as below $$m(x, y) = \Phi_1(f(x, y)) = \quad \text{eq. (8)}$$
$$\Phi_1\left(\sum_i S_i(x, y)\right) = \left\{ (x, y) \mid \sum_i S_i(x, y) \otimes G(x, y) = \text{threshold} \right\}.$$

wherein the function $S_i$ represents the mask pattern and may include both dose and shape information. G(x, y) is the Green's function that represents a mask making behavior associated with a point feature on the mask layout. The operation $\otimes$ represents the convolution. The threshold is used for contour extraction. In this case, the IBT model and the corresponding IBT process is expressed as below $$\min_{P_i} \left\| \Phi_3\left( \Phi_2\left( \left\{ (x, y) \mid \sum_i S_i(x, y) \otimes G(x, y) = \text{threshold} \right\} \right) \right) - T \right\|. \quad \text{eq. (9)}$$

In some embodiments, the IBT model is defined in equation 4 or equation 9. The IBT process is an iterative process using a cost function, such as eq. (6), eq. (7) or eq. (7).

Back to the method 100, by implementing the IBT process at the operation 106, the electron-beam shot map is generated from the final wafer pattern P(x, y) with the single IBT model and the single optimization process. The advantages of the approach includes reduced error according to various embodiments. The error is the difference between real wafer pattern and expected wafer pattern (which is defined in the final wafer pattern by the operation 104). In the current method, two separate simulation models (mask simulation model and wafer simulation model) are used to simulate the mask making process and the wafer making process, respectively. The electron-beam shot map is generated from the final wafer pattern through two iterative processes associated with two simulation models, respectively. The corresponding error includes the error associated with mask simulation model and the error associated with the wafer simulation model. Furthermore, the error associated with mask simulation model includes corresponding optimization error and model error. Similarly, the error associated with wafer simulation model includes corresponding optimization error and model error. The model error is the intrinsic error associated with that model since a simulation model is generally not perfect. Even the optimization is completed and the difference is minimized to zero, the simulated pattern is not completely converged to the real pattern. The optimization error is the error from the optimization process. The difference between the simulated pattern and the real pattern is minimized to a tolerable range. The optimization is usually not completely converged to zero difference due to various factors, such as the cost of the simulation time and efficiency. By performing the IBT process, the total error $Err_{total}$ includes only the model error $Err_{IBT,model}$ and the optimization error $Err_{IBT,optimization}$ of the IBT model as $$Err_{total} = Err_{IBT,model} + Err_{IBT,optimization}$$

The corresponding standard deviation is $$\sigma_{total} = \sqrt{\sigma_{IBT,model}^2 + \sigma_{IBT,optimization}^2}$$

Referring back to FIG. 1, the method 100 may further include an operation 108 by preparing the mask data, such as fracturing the mask pattern and generating the corresponding electron-beam shot map. In some embodiments, the operation 108 includes mask data preparation to generate the electron-beam shot map. The mask data preparation includes fracturing the mask pattern into polygons or other suitable shapes, and further includes defining dose for each polygon in some examples. When the final mask data generated from the operation 106 is already defined in the electron-beam shot map, the operation 108 may be skipped.

Still referring to FIG. 1, the method 100 may also include an operation 110 for mask making. In the present embodiments, an e-beam or a mechanism of multiple e-beams is used to form a pattern on the mask based on the electron-beam shot map. The mask can be designed in various suitable technologies. In one embodiment, the mask is designed to have a binary pattern. In this case, the mask pattern includes opaque regions and transparent regions. The radiation beam (e.g. ultraviolet or UV beam), used to expose the image sensitive material layer (such as photoresist) coated on a wafer, is blocked by the opaque region and transmits through the transparent regions. In one example, the binary mask includes a transparent substrate (e.g., fused quartz), and an opaque material (e.g., chromium) coated in the opaque regions of the mask. In another embodiment, the mask is designed to have phase shift. In the phase shift mask (PSM), various features in the pattern formed on the mask are configured to have proper phase difference to enhance the resolution and imaging quality. In various examples, the PSM can be an attenuated PSM or an alternating PSM known in the art. In some other embodiments, the mask is an extreme ultraviolet (EUV) mask having a reflective pattern. In one example, the EUV mask includes a substrate with a suitable material, such as a low thermal expansion material (LTEM). In various examples, the LTEM includes fused quartz, TiO$_2$ doped SiO$_2$, or other suitable materials with low thermal expansion. The EUV mask includes a reflective multiple layers (ML) deposited on the substrate. The ML includes a plurality of film pairs, such as molybdenum-silicon (Mo/Si) film pairs (e.g., a layer of molybdenum above or below a layer of silicon in each film pair). Alternatively, the ML may include molybdenum-beryllium (Mo/Be) film pairs, or other suitable materials that are configurable to highly reflect the EUV light. The EUV mask may further include a capping layer, such as ruthenium (Ru), disposed on the ML for protection. The EUV mask further includes an absorption layer, such as a tantalum boron nitride (TaBN) layer, deposited over the ML. The absorption layer is patterned to define a layer of an integrated circuit (IC). Alternatively, another reflective layer may be deposited over the ML and is patterned to define a layer of an integrated circuit, thereby forming an EUV phase shift mask.

During the mask making process, a resist layer sensitive to the electron-beam is coated on the mask, the resist layer is exposed using the electron-beam in an electron-beam lithography system according to the electron-beam shot map. The resist layer is further developed to form a patterned resist layer. An etching process is further applied to a material layer (such as the absorption layer) through the openings of the patterned resist layer, thereby transferring the pattern defined in the patterned resist layer to the material layer. The resist layer is removed thereafter by wet stripping, plasma ashing or both.

Other processing steps may follow after the formation of the mask. In the present embodiment, the method 100 includes an operation 112 for wafer making. A semiconductor wafer is fabricated using a mask or a set of masks formed by the above method. The semiconductor wafer includes a silicon substrate or other proper substrate and material layers formed thereon. Other proper substrate may alternatively be made of some suitable elementary semiconductor, such as diamond or germanium; a suitable compound semiconductor, such as silicon carbide, indium arsenide, or indium phosphide; or a suitable alloy semiconductor, such as silicon germanium carbide, gallium arsenic phosphide, or gallium indium phosphide.

The semiconductor wafer may further include various doped regions, dielectric features, and multilevel interconnects (or are formed at subsequent manufacturing steps). The wafer making process includes a lithography patterning process. In some examples, the lithography patterning process includes photoresist coating, lithography exposing process, post-exposure baking (PEB), and developing. The lithography patterning process forms a patterned photoresist layer on the semiconductor wafer. Particularly, the lithography exposing process is implemented in a lithography system using the mask. The wafer making process further includes other steps to transfer the pattern defined in the patterned photoresist layer to the underlying material layer on the semiconductor wafer. In one example, the wafer making process includes an ion implantation process to form various doped regions in the semiconductor wafer using the patterned photoresist layer as an implantation mask. In another example, the wafer making process includes an etching process to etch the underlying material layer (such as a dielectric material layer, a semiconductor material layer or a conductive material layer) on the semiconductor wafer using the patterned photoresist layer as an etch mask. Other embodiments and modifications may be implemented without departing from the spirit of the present disclosure.

FIG. 4 is a flowchart of the method 113 of forming an IBT model, constructed according to some embodiments. The method 113 includes an operation 114 by collecting historic data from both the mask making process and the wafer making process. In some examples, the historic data from the mask making process includes data from the electron-beam writing and the etching process, which are applied to pattern the mask. In furtherance of the examples, the data may be collected from the corresponding electron-beam lithography tool and etch tool. In some examples, the historic data from the wafer making process includes data from the lithography patterning process and the ion implantation process (or the etching process), which are applied to pattern the semiconductor wafer. In furtherance of the examples, the data may be collected from the corresponding lithography tool and ion implantation tool (or etch tool). The data may be further collected from the characteristics of the photoresist.

The method 113 also includes an operation 116 for building an IBT model using the historic data from both the mask making process and the wafer making process. In operation 116, a proper procedure may be implemented to effectively build the IBT model. In some embodiments, the IBT model is built through a procedure that includes, constructing a single mathematical model that is able to collectively simulate the mask making process and the wafer making process; and determining the coefficients or other parameters in the mathematical model using the historic data (such as using least square fit). The single mathematical model may be constructed according to various inputs, such as, theoretical analysis of the mask making process and the wafer making process, empirical formula, and engineer inputs.

The method 113 may also include an operation 118 to maintain the IBT model. As the IBT model simulates the mask making process and the wafer making process, therefore is related to the both processes and also corresponding tools (electron-beam writer, lithography exposing tool, etching tool, and so on). The mask making process and the wafer making process may change over time due to various factors, such as chemical lifetime, or characteristics of chemical batches. The corresponding tools may also shift over time, such as changes of the setting, or time between calibrations. In the operation 118, the fabrication data are continuously collected from the mask making process and the wafer making process. The newly collected fabrication data, with or without the previously collected historic data, are used to further determine (adjust) the coefficients of the IBT model to catch the shifting of the mask making process and the wafer making process, in a way similar to the operation 116. The operation 118 may be implemented in a certain frequency or may be triggered once the shift is noticed, such as from the statistical process control charts.

Figure 5:
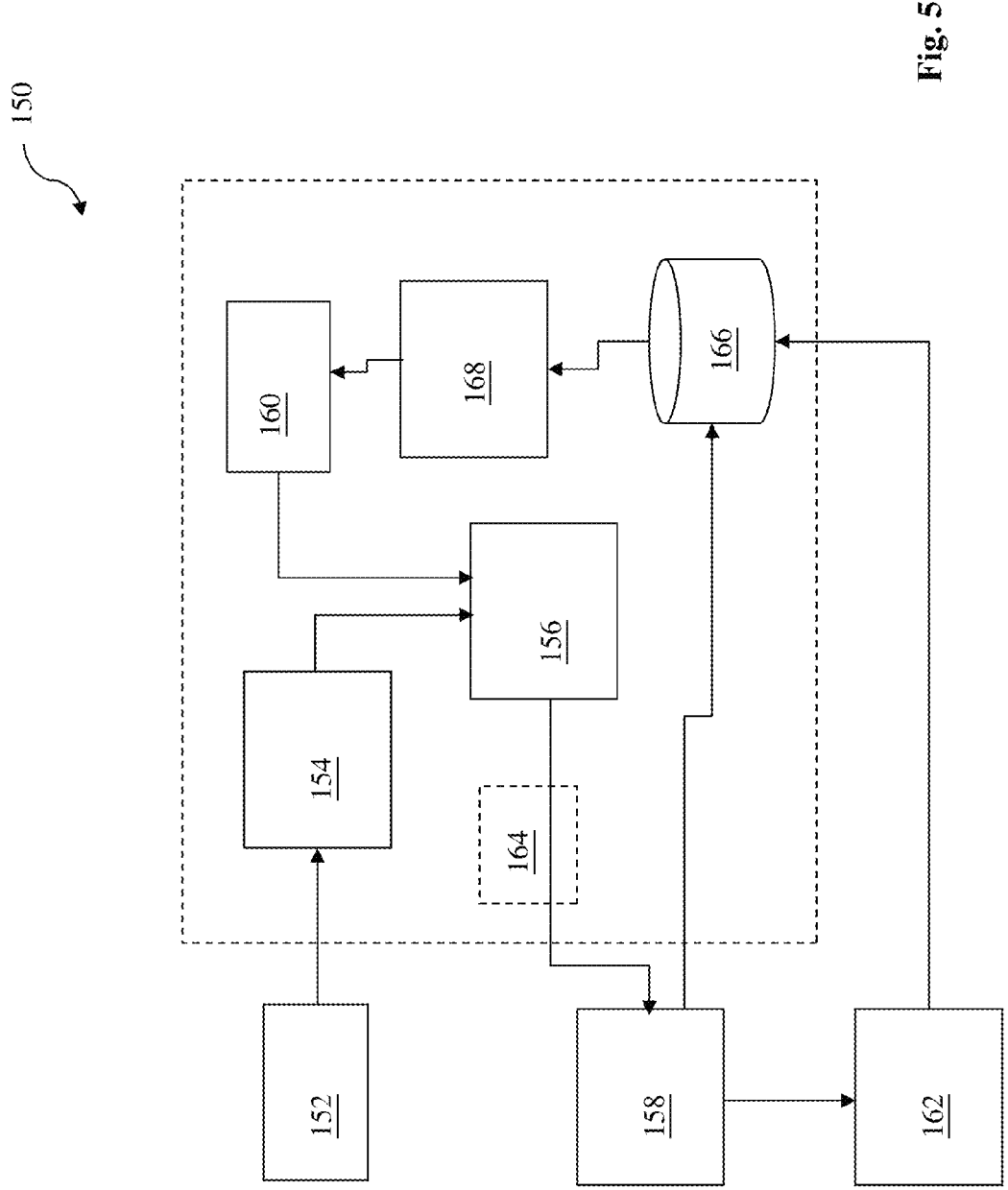
FIG. 5 is a block diagram of a system used in the methods of FIGS. 1 and 4 constructed in accordance with some embodiments.

FIG. 5 illustrates a block diagram of a tape-out system 150 of generating a tape-out data for mask making, constructed in accordance with some embodiments. The tape-out system 150 includes both hardware and software integrated to perform various actions to generate a tape-out for e-beam writing. In one embodiment, the tape-out system 150 is designed to perform various operations in the method 100 of FIG. 1. In another embodiment, the tape-out system 150 is operable to perform the operations of the method 113 of FIG. 4.

The system 150 receives an IC design layout (such as IC design layout 120 in FIG. 2), from an IC designer 152, as an input. The system 150 may include a final wafer pattern (FWP) module 154 designed to perform the operation 104 that generates the final wafer pattern according to the IC design layout.

The system 150 includes an IBT module 156 designed to perform the operation 106. In the present embodiment, the IBT module 156 is coupled with the FWP module 154 and is operable to perform the IBT process, thereby generating the mask data or electron-beam shot map as the output to the mask making module 158 for making the mask according to the mask data by the mask making process. The IBT module 156 is further coupled to an IBT model database 160 designed to keep one or more IBT model.

In some embodiments, the mask making module 158 includes an electron-beam writer, and may further includes other mask making apparatus, such as an etching tool. The mask making module 158 forms a patterned layer on the mask according to the mask data or the electron-beam shot map. Thus formed mask is further sent to a wafer making module 162. The wafer making module 162 pattern one or more semiconductor wafers using the mask. The wafer making module 162 includes a lithography exposure tool, such as an EUV scanner. In some embodiments, the wafer making module 162 may further include an etching tool that transfers the photoresist pattern to an underlying material layer on the semiconductor wafer.

The system 150 may further include a fracturing module 164 coupled between the IBT module 156 and the mask making module 158 to fracture the mask data or generate the electron-beam shot map. The fracturing module is designed to fracture the features in the mask data into a plurality of polygons. In some examples, each polygon is associated with one exposure dose (polygon exposure dose). The fracturing process to the mask data may be implemented in a rule-based mode. The fracturing module 164 includes various rules for fracturing process or is coupled with a database having those rules. Alternatively, the IBT module 156 generates the electron-beam shot map that can be directly used by the electron-beam writer. In this case, the fracturing module 164 is eliminated.

The system 150 further includes a manufacturing data (MD) module 166 designed to collect, store and maintain the historic data from the mask making process associated with the mask making module 158 and from the wafer making process associated with the wafer making module 162. The MD module 166 may further include functions to perform analysis to the collected manufacturing data. In some example, the analysis includes filtering out some low quality manufacturing data (such as data not so reliable), consolidate the manufacturing data (such as averaging). In various examples for illustration, the collected manufacturing data includes electron-beam blur, photoresist characteristic data (such as CD after developing), etching bias (such as CD after etching) and so on.

The system 150 further includes an IBT builder 168 designed to build one or more IBT model. The IBT builder 168 can perform various operations of the method 113, such as the operations 116 and 118. Particularly, the IBT builder 168 is able to build the IBT model using the collected manufacturing data or additionally is able to maintain the IBT model according to the newly collected manufacturing data such that the IBT model is tuned to catch the shifting from the mask making process and the wafer making process.

Figure 6:
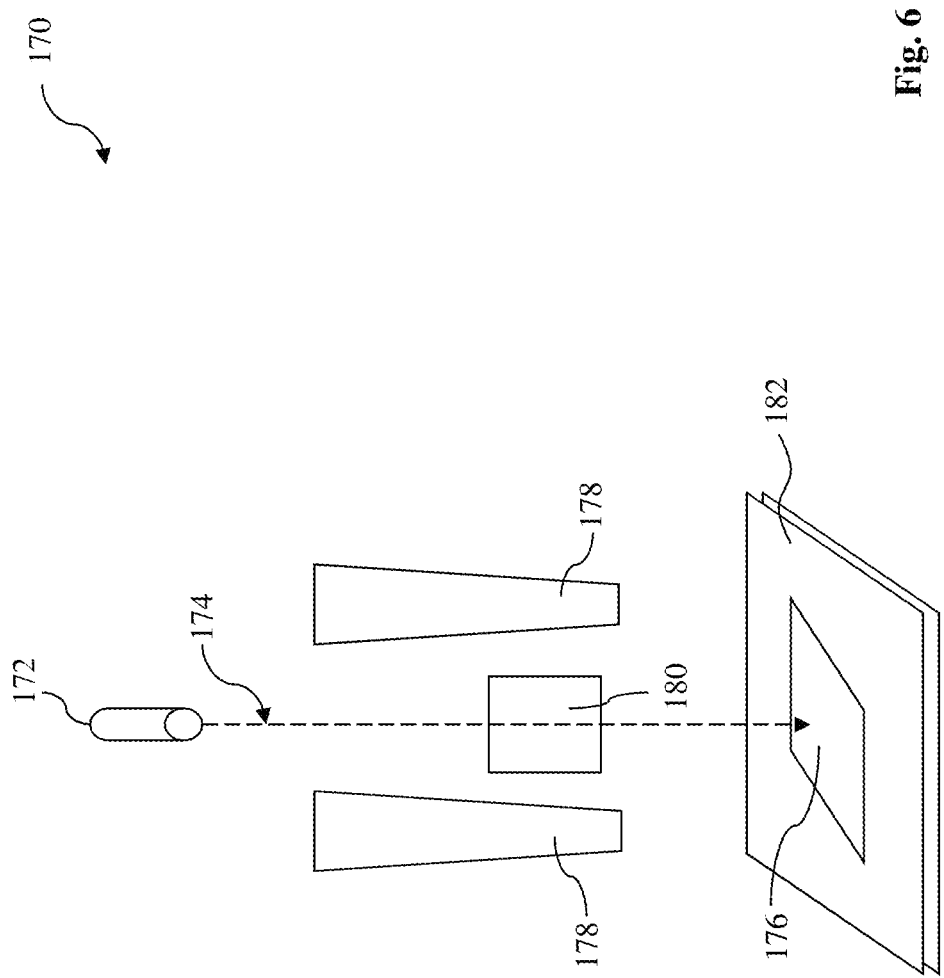
FIG. 6 is a schematic view of an electron-beam writer incorporated in the system of FIG. 5, constructed in accordance with some embodiments.

As noted above, the mask making module 158 is designed to perform the mask making process. The mask making module 158 may include various tools to perform respective processes. In the present embodiment, the mask making module 158 includes an electron-beam writer or other type of electron-beam exposure system. FIG. 6 illustrates an e-beam writer 170 constructed in accordance with some embodiments. The e-beam writer 170 includes an e-beam source 172 to provide one or more e-beams. In one embodiment, the e-beam source 172 is an electron gun with a mechanism to generate electrons, such as by thermal electron emission. In a particular example, the electron gun includes a tungsten (or other suitable material) filament designed and biased to thermally emit electrons. In FIG. 6, an electron beam 174 is illustrated as an incident electron beam from the source and directed toward a mask 176 to be patterned. As described above, the mask may be a binary mask, phase shift mask or reflective mask. In some embodiments, the mask includes an absorption material layer to be patterned.

The e-beam exposure system 170 includes one or more lenses 178 to impact the incident electron beam 174 from the source 172 for imaging effect. In one embodiment, the lenses 178 includes a condenser and further includes an objective lens properly configured. Various lenses, such as magnets, are designed to provide force to the electrons for proper imaging effect, such as focusing.

The e-beam exposure system 170 may include a scanner 180 to deflect the electron beam 174 for scanning a certain region of the mask 176 in a certain mode, such as vector mode or raster mode. The scanner 180 is operable to direct the electron beam 174 to the mask 176 positioned on a stage 182. In one example, the scanner 180 may include one or more coils to deflect the electron beam 174 in two orthogonal directions such that the electron beam is scanned over a surface area of the mask 176. The mask 176 is coated with a resist layer sensitive to the e-beam.

Although various embodiments of the present disclosure are provided above. Other embodiments may be present without departure from the spirit of the present disclosure. For example, the radiation energy for the lithography pattern may be alternatively ion beam. In this case, various corrected doses are ion beam exposure doses. In another example, the system 150 may be a separate entity or may be distributed in existing entities, such as a design/lab facility or an online system. In the present example, the system 150 is connected to a network, such as the Internet or an intranet. In yet another example, the electron-beam exposure system 170 may include a digital pattern generator to dynamically generate an e-beam pattern and to scan the resist layer for lithography exposure.

Figure 7:
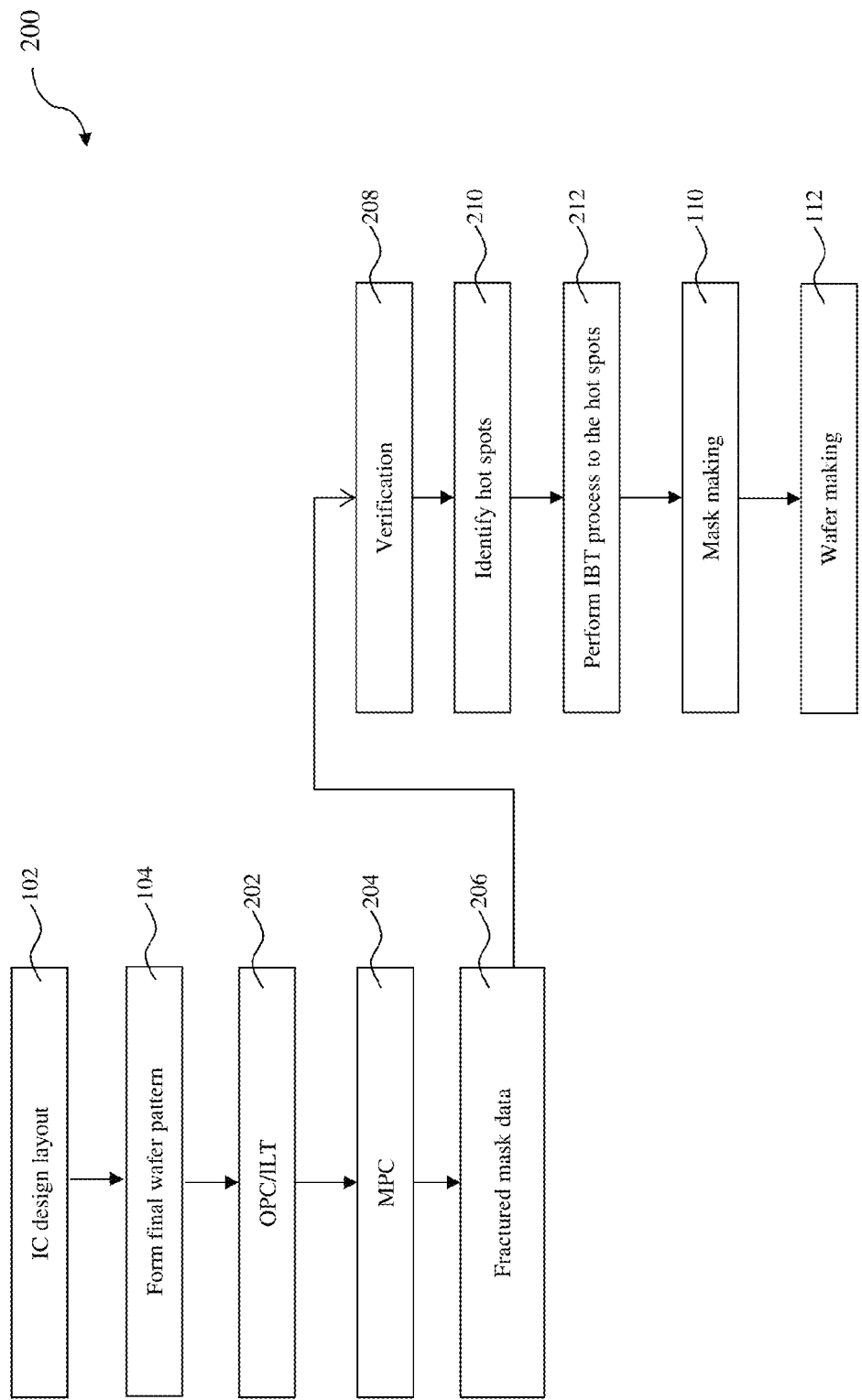
FIG. 7 is a flowchart of a method for making an integrated circuit constructed in accordance with some embodiments.

FIG. 7 is a flowchart of a method 200 for mask making or particularly, generating a mask pattern, constructed according to some embodiments. The method 200 is also implemented in the system 150. However, the method 200 includes generating mask pattern in a first procedure; identifying hot spots; and generating the corresponding portions of the mask pattern in a second procedure different from the first procedure. Especially, the second procedure includes performing an IBT process to the hot spots. Some operations in the method 200 is similar to the corresponding operations in the method 100 and the detailed descriptions to those operations are not repeated here.

The method 200 starts from the operation 102 by receiving an IC design layout. The IC design layout includes one or more layers of circuit patterns designed for an IC product and based on the specification of the IC product. The IC design layout is presented in one or more data files having the information of the circuit patterns in a proper format, such as GDS or OAS. The method 200 starts from the IC design layout to be formed on a semiconductor wafer and generates a mask data according to the IC design layout. The mask data is to be used to form a mask and the mask is used to produce the semiconductor wafer in a lithography patterning process.

In some embodiments, the first procedure may cost less time but may not be effective to some portions, referred to as hot spots. In this case, the most portions of the mask pattern are generated by the first procedure and the second procedure is applied to the hot spots. As noted above, the IC design layout includes a plurality of main features. For illustration, only one feature is provided in the subsequent figures, such as the IC design layout 120 illustrated in FIG. 2.

The method 200 may further include an operation 104 by forming a final wafer pattern from the IC design layout 120. In some embodiments, the operation 104 includes adding dummy features to the IC design layout 120 in order optimize the semiconductor fabrication, such as a CMP process or a thermal annealing process. In some embodiments, the dummy features are added to the IC design layout in the die-corner-circuit-forbidden region for chip corner stress relief. In some other embodiments, the operation 104 may additionally or alternatively include adding other features, such as such as a barcode, alignment mark, and/or test pattern to the IC design layout in proper locations, such as in the frame region for various fabrication usages and considerations. The output of the operation 104 is the final wafer pattern. In one example for illustration, dummy features 130 are inserted into the IC design layout 120, thereby forming a final wafer pattern 132 as shown in FIG. 3. In the present example, the dummy features 130 are added to change the local pattern density such that the pattern density has less variation from location to location, thereby the processing variation and other unexpected effects are reduced or eliminated.

In the following descriptions, the main feature 122 is illustrated in FIG. 8 only as an exemplary feature for simplicity. In a particular example, the main feature 122 is a rectangle that defines a contact hole to be formed on a semiconductor substrate. In other examples, the main feature 122 may include a polygon (or trapezoid) or another suitable shape.

During the subsequent simulations, the simulated contour is compared with a wafer target to determine the difference. In some embodiments, the original mask layout of main features 122 is used as the wafer target. However, the wafer target may be chosen differently, such as wafer target 190 in FIG. 9, for better iterative simulation convergence without degradation to the wafer pattern. During the iterative simulations, the simulated contour is compared to the wafer target to determine the difference.

Referring to FIG. 7, the method 200 includes an operation 202 by performing an optical proximity correction (OPC) process to the final wafer target 190 (or the IC design layout 120 if the operation 104 is skipped). The OPC is performed to correct the image errors by modifying the IC design layout. The OPC process generates a mask pattern such that thus generated mask pattern is able to form a wafer pattern on the semiconductor wafer with a tolerable difference from the wafer target. The OPC process may be model-based OPC, rule-based OPC, table-based OPC, or combinations thereof.

The OPC includes moving edges of a main feature and adding assist features to the mask data. In various embodiments, the main feature is resized, repositioned, and/or reshaped. In another embodiment, various assist features, such as scattering bars, are added to the mask data. In still another embodiment, serifs or hammerheads are added to the mask data. The assist features may be placed a distance away from the main feature (such as scattering bars) or be placed adjacent to the main feature (such as serifs and hammerheads).

In another embodiment, the OPC process may be implemented in consideration of the environmental impact, such as those features approximate the main feature 122. The environmental impact includes etching loading effect, the loading effect of the lithography patterning or the pattern density of a chemical mechanical polishing (CMP) process. Those environmental impacts may be considered during the OPC process by a model convolution. In one example, the environment-induced-corner-rounding critical level may be defined by the model convolution and is incorporated in a model-based OPC process. In some embodiments, the OPC process simulate the wafer masking process that includes the imaging effect of the lithography exposing process, responses of the photoresist layer to the light radiation during the lithography exposing and to the developing solution during the developing process, and/or an etching process to transfer the pattern from the photoresist layer to the underlying material layer of the semiconductor substrate.

In some embodiments, the OPC process is model-based. The OPC model simulates the imaging effect of the lithography exposing process to be applied to the semiconductor wafer. During the OPC model-based process, a main feature is adjusted as described above (adding assist features, resizing, repositioning and/or reshaping), then the modified mask data is simulated by the OPC model, thereby generating a simulated wafer contour. The simulated contour is further compared with the wafer target to evaluate if the modified mask data is acceptable. The evaluation is implemented by a proper procedure, such as edge placement error, or area difference. In one particular example, various target points are assigned to the wafer target. When the simulated wafer contours are within a tolerable distance from the target points, it is considered that the modified mask data is acceptable. Thus modified mask data becomes the desired mask pattern (also referred to as OPCed mask pattern). When the desired mask pattern is formed on the mask, the corresponding wafer pattern is substantially similar to the final wafer target or with a difference less than an acceptable range. FIG. 11 illustrates a desired mask pattern 192 of the main feature 122 generated by the operation 202 in accordance with some embodiments. The corresponding mask target may be the desired mask pattern 192 or alternatively a different pattern, such as the mask target 194 as illustrated in FIG. 12, for better iterative simulation convergence without degradation to the mask pattern. During the iterative simulations, the simulated mask contour is compared to the mask target to determine the difference.

In some embodiments, the operation 202 includes an inverse lithography technology (ILT) process. The ILT process uses an ILT model to simulate the lithography exposing process but the ILT model has a wafer pattern as an input and a mask pattern as an output. Thus, the ILT process directly generates a mask pattern according to the wafer pattern (such as the final wafer target).

The method 200 then proceeds to an operation 204 by performing a mask proximity correction (MPC) process. The MPC process uses the desired mask pattern (or mask target) generated by the operation 202 as an input and generates a mask data (also referred to as MPCed mask data or MPCed mask pattern) as an output. The MPC process includes a MPC model to simulate the mask making process (such as an electron-beam lithography process to pattern the mask). During the MPC process, the pattern to be written to the mask so as to compensate for any imaging effects associated with the mask making (such as e-beam to pattern the mask). During the MPC process, the mask pattern (or mask data) is modified such the real mask pattern formed on the mask is substantially same to the desired mask pattern. Specifically, when thus generated mask data is imaged on the mask, the simulated mask contour is substantially the same to the desired mask pattern. FIG. 13 illustrates an MPCed mask pattern 196 generated from the OPCed mask pattern 192 in accordance with some embodiments.

The method 200 may proceed to an operation 206 by fracturing the mask pattern. The operation 206 uses the MPCed mask pattern from the operation 204 as an input and generates a fractured mask pattern as an output. The operation 206 is similar to the operation 106 of the method 100.

The method 200 may proceed to an operation 208 by performing a verification process to the MPCed mask pattern. In some embodiments, the verification process includes mask rule check (MRC) to the MPCed mask pattern 120. In the operation 208, the mask pattern (the MPCed mask pattern 196 for example) is checked by one or more mask rules and is modified accordingly. In one embodiment, various mask rules are extracted from the mask fabrication. Various mask making data are collected from the mask fabrication and extracted into a set of rules that the mask pattern should follow. In one embodiment, the MRC is applied to various segments or portions of the mask pattern 196. Those segments or portions that fail one or more mask rules are modified according to the corresponding mask rules. In some embodiments, the verification process includes wafer pattern verifications.

Still referring to FIG. 7, the method 200 proceeds to an operation 210 by identifying hot spots of the mask pattern (such as the MPCed pattern 206 or the mask pattern that is further modified by the operations 206 and 208). In the operation 210, the hot spots are identified as those portions of the mask pattern that do not generate desired features or do not meet one or more criteria, such as failing MRC. The operation 210 may be implemented in a proper procedure. For some embodiments, the MPCed mask pattern is checked by MRC to identify hot spots. In furtherance of the embodiments, the operations 208 and 210 may be implemented in one procedure designed to check and modify each portion of the mask pattern. Portions of the mask pattern that pass the MRC are considered as the corresponding portions in the final mask pattern. Other portions of the mask pattern are identified as hot spots if they cannot pass MRC or without proper way to modify to pass MRC. Mask patterns may also be identified as hot spots if they cannot pass wafer printing check. The hot spots are further modified in the subsequent operation, thereby generating the final mask pattern.

The method 200 proceeds to an operation 212 by performing an IBT process to the mask pattern. However, in the operation 212, the IBT process is not applied to all portions of the mask pattern but only to the hot spot(s) of the mask pattern. Thus, the hot spot(s) of the mask pattern is further modified during the IBT process. The modified hot spot(s) by the IBT process plus other portions of the MPCed mask pattern constitute the final mask pattern. In some examples, the IBT process is more effective as described in the method 100 of FIG. 1 but may take longer calculation time. The method 200 takes a hybrid approach, in which the final mask pattern is partially generated through a procedure using separate OPC model and MPC model (such as described in the operations 202 and 204. Only identified hot spots are further modified to generate the corresponding portions of the final mask pattern by the IBT process. Overall the hybrid approach is both effective and efficient.

The IBT process in the operation 212 is similar to the IBT process in the operation 106 of the method 100 except for that the operation 212 is only applied to the hot spots. Particularly, the IBT model is a single mathematical model (IBT model) to collectively simulate a mask making process to pattern the photomask and a wafer making process to pattern the semiconductor wafer. In the present embodiment, the mask making process includes an electron-beam direct writing process used to pattern the photomask. Specifically, the wafer making process includes a lithography exposing process to form an exposure image on a photoresist layer coated on the semiconductor wafer. The wafer making process may further include processes associated with the characteristics of the photoresist. In furtherance of the example, the wafer making process includes radiation-induced reaction of the photoresist during the lithography exposing process and dissolution of the photoresist during a developing process, thereby forming a patterned photoresist layer. In some examples, the wafer making process further includes an etching process applied to the semiconductor wafer, thereby forming a patterned material layer on the semiconductor wafer using the patterned photoresist layer as an etch mask. In an alternative example, the wafer making process further includes an ion implantation process applied to the semiconductor wafer, thereby forming doped features in the semiconductor wafer using the patterned photoresist layer as an implantation mask.

In some embodiments, the IBT model includes a mathematical model defined in equation 4. In some embodiments, the IBT process uses a cost function to evaluate the difference between the final wafer pattern and simulated wafer contour in an iterative way. The cost function may be defined according to the edge placement error, such as defined in equation 6, or alternatively be defined according to the area difference, such as defined in equation 7. As the IBT process in the operation 212 is similar to the IBT process in the operation 106 of the method 100, the similar descriptions are not repeated here.

Still referring to FIG. 7, the method 200 may also include an operation 110 for mask making. In the present embodiments, an e-beam or a mechanism of multiple e-beams is used to form a pattern on the mask based on the electron-beam shot map. The mask can be designed in various suitable technologies. In one embodiment, the mask is designed to have a binary pattern. In this case, the mask pattern includes opaque regions and transparent regions. The radiation beam (e.g. ultraviolet or UV beam), used to expose the image sensitive material layer (such as photoresist) coated on a wafer, is blocked by the opaque region and transmits through the transparent regions. In one example, the binary mask includes a transparent substrate (e.g., fused quartz), and an opaque material (e.g., chromium) coated in the opaque regions of the mask. In another embodiment, the mask is designed to have phase shift. In the phase shift mask (PSM), various features in the pattern formed on the mask are configured to have proper phase difference to enhance the resolution and imaging quality. In various examples, the PSM can be an attenuated PSM or an alternating PSM known in the art. In some other embodiments, the mask is a reflective mask for extreme ultraviolet (EUV) exposure, such as the EUV mask described above.

Figure 14:
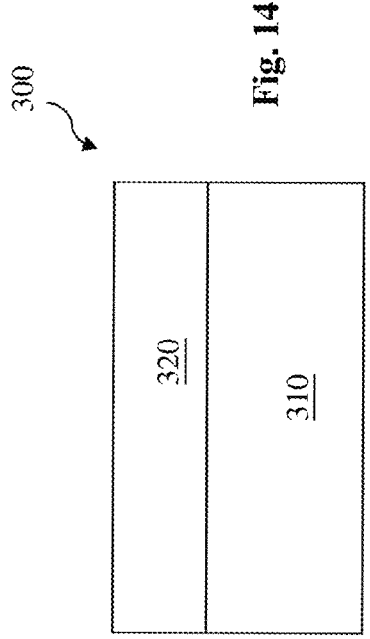
FIGS. 14-17 are sectional views of a semiconductor wafer at various fabrication stages, constructed in accordance with some embodiments.

In some embodiments, the method 100 may include an operation 112 for wafer making. Illustrated in FIG. 14 is a sectional view of a semiconductor wafer 300 in accordance with some embodiments. The semiconductor wafer 300 is fabricated using a mask or a set of masks formed by the above method. The semiconductor wafer 300 includes a semiconductor substrate 310, such as a silicon substrate or a substrate additionally or alternatively having some other semiconductor material, such as germanium, silicon germanium, silicon carbide, gallium arsenide. The semiconductor wafer 300 may further include various doped regions, dielectric features, and multilevel interconnects (or are formed at subsequent manufacturing steps). The semiconductor wafer 300 may further include a material layer 320 to be patterned. The material layer 320 includes a dielectric layer or a conductive layer in some embodiments. The material layer 320 may include a semiconductor material layer or is a top portion of the semiconductor substrate in some embodiments. The semiconductor wafer 300 includes a silicon substrate or other proper substrate and material layers formed thereon.

Figure 15:
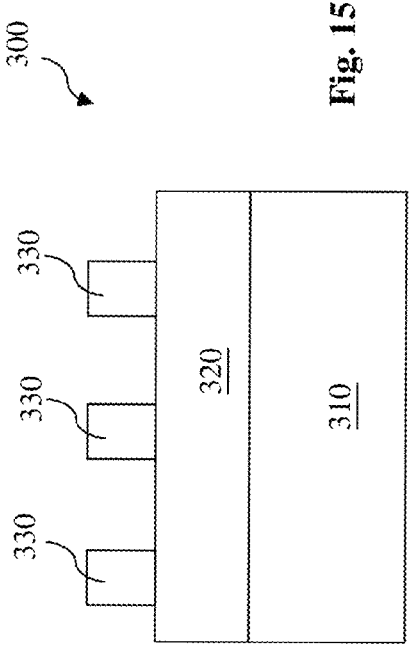
Figure 16:
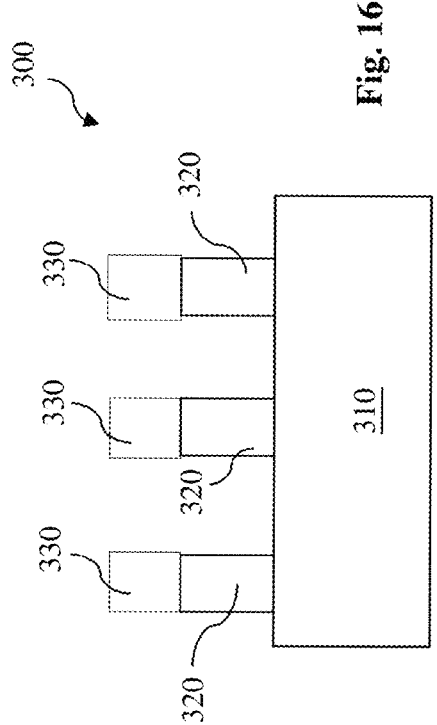
Figure 17:
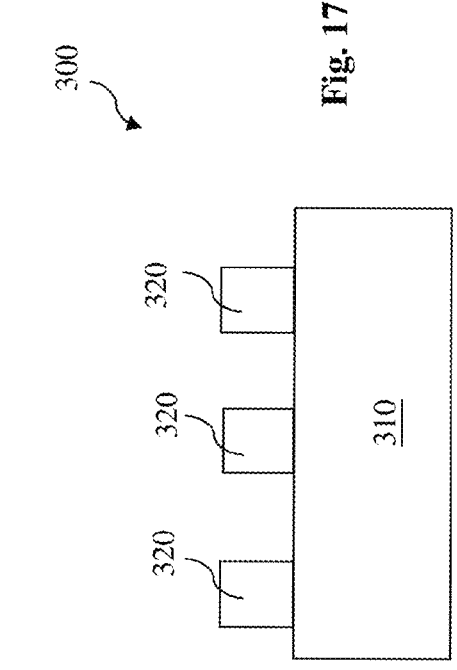

The wafer making process includes a lithography patterning process. In some examples, the lithography patterning process includes photoresist coating, lithography exposing process, PEB, and developing. The lithography patterning process forms a patterned photoresist layer 330 on the semiconductor wafer 300, as illustrated in FIG. 15. Particularly, the lithography exposing process is implemented in a lithography system using the mask fabricated by the operation 110. The wafer making process further includes other steps to transfer the pattern defined in the patterned photoresist layer 330 to the underlying material layer 320. In one example, the wafer making process includes an ion implantation process to form various doped regions in the semiconductor wafer using the patterned photoresist layer as an implantation mask. In another example, the wafer making process includes an etching process to etch the underlying material layer 320 using the patterned photoresist layer as an etch mask, as illustrated in FIG. 16. After the etching process (or the ion implantation process), the patterned resist layer may be removed by wet stripping or plasma ashing, as illustrated in FIG. 17.

Other embodiments and modifications may be implemented without departing from the spirit of the present disclosure. The present disclosure provides a method for generating a mask pattern according to an IC design layout. Particularly, the method includes an IBT process to generate the final mask pattern (or final mask data), wherein the IBT process uses a single mathematical model to simulate both the mask making process and the wafer making process. By implementing the disclosed method (such as 100 or 200) in various embodiments, some of advantages described below may present. However, it is understood that different embodiments disclosed herein offer different advantages and that no particular advantage is necessarily required in all embodiments. As one example, by performing the IBT process, the generated final mask pattern includes reduced error according to various embodiments. For example, the total error in the disclose method is described in the formula $Err_{total}=Err_{IBT,model}+Err_{IBT,optimization}$, which only includes the IBT model error and optimization error of the IBT process, much less than the error from the existing methods.

Thus, the present disclosure provides an integrated circuit (IC) method in accordance with some embodiments. The method includes receiving an IC design layout; and performing an inverse beam technology (IBT) process to the IC design layout, thereby generating a final mask pattern, wherein the IBT process uses a single IBT model to simulate both a mask making process and a wafer making process.

The present disclosure provides an integrated circuit (IC) method in accordance with some embodiments. The method includes receiving an IC design layout; performing an optical proximate correction (OPC) process to the IC design layout, thereby generating an OPCed mask pattern; performing a mask proximate correction (MPC) process to the OPCed mask pattern, thereby generating a MPCed mask pattern; fracturing the MPCed mask pattern; identifying hot spots of the IC design layout according to the MPCed mask pattern; and performing an inverse beam technology (IBT) process to the IC design layout in the hot spots, thereby generating a final mask pattern, wherein the IBT process uses a single IBT model to simulate both a mask making process and a wafer making process.

The present disclosure provides an integrated circuit (IC) system in accordance with some embodiments. The system includes a manufacturing data module designed to collect manufacturing data from both a mask making process and a wafer making process; an IBT builder designed to build an IBT model using the manufacturing, wherein the IBT model simulates both the mask making process and the wafer making process; and an inverse beam technology (IBT) module designed to perform an IBT process using the IBT model to generate a final mask pattern according an IC design layout.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments disclosed herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. An integrated circuit (IC) method comprising:
receiving an IC design layout;
performing an optical proximate correction (OPC) process to the IC design layout, thereby generating an OPCed mask pattern;
performing a mask proximate correction (MPC) process to the OPCed mask pattern, thereby generating an MPCed mask pattern;
fracturing the MPCed mask pattern;
identifying hot spots of the IC design layout according to the MPCed mask pattern; and
performing, using an apparatus, an inverse beam technology (IBT) process to the IC design layout in the hot spots, thereby generating a final mask pattern, wherein the IBT process uses a single IBT model to simulate both a mask making process and a wafer making process.

2. The method of claim 1, wherein the IBT model is defined in a formula $P(x, y)=\Phi_3(\Phi_2(\Phi_1(f(x, y))))$, wherein
$P(x, y)$ defines a simulated wafer contour;
$f(x, y)$ defines an electron-beam shot map;
$\Phi_1$ defines a mask making function that simulates the mask making process;
$\Phi_2$ defines a wafer imaging function that simulates an imaging of the mask on the semiconductor wafer during the a lithography exposing process; and
$\Phi_3$ defines a wafer pattern function that simulates characteristics of a photoresist coated on the semiconductor wafer.

3. The method of claim 2, wherein the performing of the IBT process includes performing an iterative process to the IC design layout in the hot spots using a cost function defined as $$\min_f \left\{ \sum_j \|EPE(x_j, y_j)\| \right\},$$

in which EPE is an edge placement error function.

4. The method of claim 2, wherein the performing of the IBT process includes performing an iterative process to the IC design layout using a cost function defined a cost function with area difference as $$\min_f \left\{ \sum_k \|P_k - T_k\| \right\},$$

in which $P_k$ and $T_k$ represent the simulated wafer contour $P(x, y)$ and the desired wafer target T in a $k^{th}$ region.

5. The method of claim 1, further comprising generating an electron-beam shot map from the final mask pattern, wherein the electron-beam shot map to be used in an electron-beam lithography process to pattern a mask.

6. The method of claim 5, further comprising performing the mask making process to the mask using the electron-beam shot map, wherein the mask making process includes the electron-beam lithography process.

7. The method of claim 6, further comprising performing the wafer making process to a semiconductor wafer, wherein the wafer making process includes a lithography exposing process using the mask.

8. The method of claim 7, wherein the cost function is further defined as $$\min_f \left\{ \sum_k \|P_k - T_k\| \right\},$$

in which $P_k$ and $T_k$ represent the simulated wafer contour $P(x, y)$ and the desired wafer target T in a $k^{th}$ region.

9. The method of claim 1, further comprising forming a final wafer pattern based on the IC design layout, wherein the final wafer pattern is a desired wafer pattern to be formed on a semiconductor wafer.

10. An integrated circuit (IC) method comprising:
performing an optical proximate correction (OPC) process to an IC design layout, thereby generating an OPCed mask pattern;
performing a mask proximate correction (MPC) process to the OPCed mask pattern, thereby generating an MPCed mask pattern;
identifying hot spots of the IC design layout according to the MPCed mask pattern; and
performing, using an apparatus, an inverse beam technology (IBT) process to the IC design layout in the hot spots, thereby generating a final mask pattern, wherein the IBT process uses an IBT model to simulate both a mask making process and a wafer making process.

11. The method of claim 10, further comprising fracturing the MPCed mask pattern, and
wherein identifying hot spots of the IC design layout according to the MPCed mask pattern includes identifying hot spots of the IC design layout according to the fractured MPCed mask pattern.

12. The method of claim 10, further comprising performing a verification process to the MPCed mask pattern, wherein the verification process includes running a mask rule check against a portion of the MPCed mask pattern.

13. The method of claim 12, further comprising modifying the portion of the MPCed mask pattern when the portion fails the mask rule check.

14. The method of claim 10, wherein performing, using the apparatus, the IBT process to the IC design layout in the hot spots includes performing the IBT process to the IC design layout only in the spots.

15. The method of claim 10, wherein performing the OPC process to the IC design layout includes moving edges of a main feature and adding assist features to generate the OPCed mask pattern.

16. An integrated circuit (IC) method comprising:
performing an optical proximate correction (OPC) process to an IC design layout, thereby generating an OPCed mask pattern;
performing a mask proximate correction (MPC) process to the OPCed mask pattern, thereby generating an MPCed mask pattern;
identifying hot spots of the IC design layout according to the MPCed mask pattern;
performing, using an apparatus, an inverse beam technology (IBT) process to the IC design layout in the hot spots, thereby generating a final mask pattern, wherein the IBT process uses an IBT model to simulate both a mask making process and a wafer making process; and
performing the mask making process to fabricate a mask based on the final mask pattern.

17. The method of claim 16, further comprising performing the wafer making process by using the mask to pattern a wafer.

18. The method of claim 16, wherein the IBT model is defined in a formula $P(x, y) = \Phi_3(\Phi_2(\Phi_1(f(x, y))))$, wherein
$P(x, y)$ defines a simulated wafer contour;
$f(x, y)$ defines an electron-beam shot map;
$\Phi_1$ defines a mask making function that simulates the mask making process;
$\Phi_2$ defines a wafer imaging function that simulates an imaging of the mask on the semiconductor wafer during the a lithography exposing process; and
$\Phi_3$ defines a wafer pattern function that simulates characteristics of a photoresist coated on the semiconductor wafer.

19. The method of claim 18, wherein the performing of the IBT process further includes performing an iterative process to the final wafer pattern using a cost function expressed as $$\min_f \|P - T\|,$$

wherein P is the simulated wafer contour $P(x, y)$ and T is a desired wafer target.

20. The method of claim 19, wherein the cost function is further defined as $$\min_f \left\{ \sum_j \|EPE(x_j, y_j)\| \right\},$$

in which EPE is an edge placement error function.

* * * * *